United States Patent Office 2,955,131
Patented Oct. 4, 1960

2,955,131
NITRITE ESTER OF METHYL BUTYNOL

Daniel C. Rowlands, Worthington, Ohio, assignor, by mesne assignments, to Air Reduction Company, Inc., New York, N.Y., a corporation of New York No Drawing. Filed Nov. 6, 1957, Ser. No. 694,746

1 Claim. (Cl. 260—466)

This invention relates to a novel chemical compound and to a process for preparing said compound.

More particularly, the invention is concerned with the new nitrite ester of 3-methyl-1-butyn-3-ol which can be represented by the formula

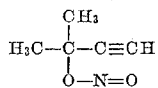

This new compound can be used as a bactericide, a propellant fuel, and as an intermediate in the preparation of corrosion inhibitors and other useful organic compounds. For example, the novel compound of this invention can be hydrogenated to form tertiary amyl nitrite. Hydrogenation techniques such as those used in the hydrogenation techniques such as those used in the hydrogenation of acetylenic carbinols to saturated carbinols can be employed. Such techniques are shown, for example, in Acetylenic Compounds, by Johnson, volume I, pp. 100–101 (Arnold, London, 1946).

The nitrite ester of 3-methyl-1-butyn-3-ol can be obtained by reacting nitrosyl chloride with 3-methyl-1-butyn-3-ol in the presence of a compound capable of accepting hydrogen chloride released by the formation of the ester. Such hydrogen chloride acceptors are normally basic amines, of which pyridine is representative.

The invention is further disclosed in the following example, which is illustrative, but not limitative thereof.

Example

Pyridine, in the amount of 79.1 g. (1.0 mole), and 84.1 g. (1.0 mole) of 3-methyl-1-butyn-3-ol, were stirred, while 60.0 g. (0.91 mole) of nitrosyl chloride was added at such a rate that it was all adsorbed. The temperature remained at 20°–30° C. throughout the addition. After all the nitrosyl chloride had been added, the solution was stirred for a few minutes, 400 ml. of ethyl ether was added, and the solution was cooled to 0° C. The precipitated pyridine hydrochloride was removed by filtration, the solvent was evaporated, and the reaction product was distilled into four fractions as follows: Fraction 1 (7.1 g.; B.P. 55°–76° C./750 mm.), fraction 2 (5.0 g.; B.P. 76°–78° C./750 mm.), fraction 3 (65.1 g.; B.P. 78°–82° C./750 mm.), and residue (B.P. >82° C./750 mm.). Fraction 3 was the nitrite ester and amounts to a 53 percent yield based on nitrosyl chloride. This fraction was redistilled to obtain the purified ester (49.7 g., 44 percent yield; B.P. 80°–82° C./750 mm.; $n_D^{20}$ 1.3926).

The nitrite ester of methyl butynol can be hydrogenated to form tertiary amyl nitrite under moderately elevated temperature and pressure conditions, preferably in the presence of a hydrogenation catalyst. Temperatures of about 60° C. to 120° C. and pressures of 30 to 500 p.s.i.g. are generally suitable. The hydrogenation is preferably conducted in an inert solvent reaction medium.

Illustrative of the hydrogenation of the nitrite ester of methyl butynol to form tertiary amyl nitrite is the following:

About 0.5 mole of the nitrite ester of methyl butynol is dissolved in 100 cc. of heptane and the resulting mixture is heated to 80° C. About 1 gram of finely divided palladium on charcoal catalyst (5% Pd) is added. The resulting mixture is then contacted with hydrogen at 100 p.s.i.g. for one hour. A high yield of tertiary amyl nitrite is obtained after purification of the reaction mixture.

The present application is a continuation-in-part of my copending application, Serial No. 424,751, filed April 21, 1954, now abandoned.

What is claimed is:

The nitrite ester of 3-methyl-1-butyn-3-ol.

References Cited in the file of this patent

FOREIGN PATENTS 78,856    Norway _____ July 30, 1951

OTHER REFERENCES

Lee et al.: "J. Am. Pharm. Assoc.," 21, 125–28, 1932.

UNITED STATES PATENT OFFICE
CERTIFICATE OF CORRECTION

Patent No. 2,955,131            October 4, 1960

Daniel C. Rowlands

It is hereby certified that error appears in the printed specification of the above numbered patent requiring correction and that the said Letters Patent should read as corrected below.

Column 1, lines 30 and 31, strike out "techniques such as those used in the hydrogenation".

Signed and sealed this 11th day of April 1961.

(SEAL)
Attest:

ERNEST W. SWIDER            ARTHUR W. CROCKER
Attesting Officer            Acting Commissioner of Patents